United States Patent [19]

Pampalone et al.

[11] 4,401,775

[45] Aug. 30, 1983

[54] EPOXY ENCAPSULATING FORMULATION

[75] Inventors: Thomas R. Pampalone, Branchville, N.J.; Sidney S. Seffren, Philadelphia, Pa.

[73] Assignee: RCA Corporation, New York, N.Y.

[21] Appl. No.: 391,923

[22] Filed: Jun. 24, 1982

[51] Int. Cl.$^3$ .............................................. C08L 63/00
[52] U.S. Cl. .................................. 523/403; 524/404; 524/427; 524/428; 525/524
[58] Field of Search ............... 523/404, 403, 427, 428; 525/524; 528/103, 115, 112

[56] References Cited

U.S. PATENT DOCUMENTS

| | | | |
|---|---|---|---|
| 2,768,153 | 10/1956 | Shokal | 528/112 |
| 2,890,195 | 6/1959 | Phillips et al. | 528/115 |
| 2,967,843 | 1/1961 | Delmonte et al. | 528/112 |
| 3,247,283 | 4/1966 | McGary et al. | 528/103 |
| 3,296,332 | 1/1967 | Chase et al. | 528/103 |
| 3,578,633 | 5/1971 | Rossa | 528/112 |
| 3,689,444 | 9/1972 | Wolfe | 525/524 |
| 4,137,275 | 1/1979 | Smith et al. | 525/524 |

OTHER PUBLICATIONS

Lee and Neville, *Handbook of Epoxy Resins*, McGraw-Hill, 1967, pp. 17-7 to 17-42.
May and Tanaka, *Epoxy Resins, Chemistry and Technology*, Marcel Dekker, Inc. 1973, pp. 487-512 and 579-582 from a chapter by A. J. Breslau entitled, "Electrical and Electronic Application".

*Primary Examiner*—Lewis T. Jacobs
*Attorney, Agent, or Firm*—Birgit E. Morris; R. Hain Swope

[57] ABSTRACT

Epoxy resin compositions are disclosed which have an exceptional capacity to penetrate tightly wound wire bundles such as tertiary coils in high voltage flyback transformers. The subject compositions are therefore useful for encapsulating such coils.

8 Claims, No Drawings

EPOXY ENCAPSULATING FORMULATION

This invention relates to an encapsulating formulation with improved penetration capability particularly suited for encapsulating the tertiary coils of high voltage flyback transformers.

BACKGROUND OF THE INVENTION

For a high voltage transformer to function effectively, it is necessary that the wire bundle of the tertiary be encapsulated with a resin that penetrates the bundle to insulate the individual wires. In addition, the resin must have excellent electrical, mechanical and adhesive properties. The resin therefore, must be an insulator, it must be flexible, and it must withstand the stress of adhering to the interface between materials of differing coefficients of thermal expansion.

While resins which are satisfactory in terms of their electrical, mechanical and adhesive properties are known and commercially available, one recognized shortcoming in all has been their inability to penetrate the tightly wound wire bundle of the tertiary. The inability of the commercial formulations, as well as many prepared by us, to completely penetrate and encapsulate the tertiary has resulted in voids which, when high voltage was applied, produced corona discharge and subsequent shorting out of the tertiary. Accordingly, there exists a need for a resin composition which is at least comparable to those presently known in electrical, mechanical and adhesive properties and which additionally effectively penetrates and encapsulates the tertiary, particularly the tightly wound wire bundle thereof. Such a composition is provided in accordance with this invention.

BRIEF SUMMARY OF THE INVENTION

The encapsulating resin compositions of this invention comprise an epoxy resin component comprising a bisphenol A resin and a cycloaliphatic resin, and a hardener component comprising the maleic anhydride adduct of methylcyclopentadiene and dodecyl succinic anhydride. The compositions preferably also contains a defoamer, a cure accelerator, a plasticizer and a filler.

DETAILED DESCRIPTION OF THE INVENTION

The epoxy resin component of the compositions of this invention is a mixture of a bisphenol A based epoxy resin and a cycloaliphatic epoxy resin. Epoxy resins based on bisphenol A, i.e., 4,4'-isopropylidene-diphenol, and their applications are well known. A preferred resin in accordance with this invention is polyDGEBA, i.e., a resin of the diglycidyl ether of bisphenol A. It is essential that the members of the epoxy resin component of the subject compositions be liquids. Therefore, only those resins having a low n value, i.e., a low degree of polymerization, are useful in this invention. A particularly preferred bisphenyl A epoxy resin in accordance with this invention is liquid polyDGEBA having an n value of about 0.2 available from Shell Oil Co. under the trademark Epon 828.

The second member of the epoxy resin component of the subject compositions is a liquid cycloaliphatic epoxy resin. This resin, because it contains no benzene rings, is less likely to carbonize at high temperatures. This is advantageous since the presence of carbon char is known to cause surface arcing. This resin, therefore, functions as an arcing reducer. As it is a liquid, it likewise lowers viscosity and aids penetration. A preferred liquid cycloaliphatic epoxy resin is a liquid 3,4-epoxycyclohexylmethyl-(3,4-epoxy)cyclohexane carboxylate resin available under the trademark CY-179 from Ciba-Geigy Corporation.

The epoxy resin component of the subject compositions is comprised of from about 40 to about 80, preferably from about 50 to about 60, percent by weight of the liquid bisphenol A resin with the remainder being the liquid cycloaliphatic epoxy resin.

The second component of the subject encapsulating compositions, i.e. the hardener component, is comprised of dodecyl succinic anhydride and the maleic anhydride adduct of methylcyclopentadiene, i.e. methyl-bicyclo-[2.2.1]-heptene-2.3-dicarboxylic anhydride. These two materials act in concert to give the subject compositions heat stability and exceptional penetrating ability in addition to curing and hardening the resin. Although dodecyl succinic anhydride is a known curing agent having surface active properties, its exceptional ability to penetrate the tightly wound wire bundle is considered unexpected.

The hardener component of the subject compositions is comprised of from about 70 to about 90, preferably from about 83 to about 88, percent by weight dodecyl succinic anhydride with the remainder being the maleic anhydride adduct of methylcyclopentadiene. The epoxy resin component and the hardener component are present in the subject composition in a one-to-one stoichiometric ratio. The compounding of epoxy resins by stoichiometry is well known to those of ordinary skill in the art.

The subject encapsulating resin compositions may additionally contain up to 70 percent by weight of one or more optional ingredients selected from the group consisting of a defoamer, a curing accelerator, a flexibilizer and a filler. On a weight basis, the subject compositions may contain up to about 1 percent, preferably from about 0.2 to about 0.4 percent of the defoamer, up to about 2.5 percent, preferably from about 0.4 to about 0.8 percent, of the curing accelerator, up to about 3 percent, preferably from about 1 to about 2 percent of the flexibilizer, and up to about 65 percent, preferably from about 58 to about 62 percent, of a suitable filler.

The defoamer, when such is present, can be any commercially available liquid defoamer recognized as being compatible with epoxy resin compositions. A preferred defoamer is a polysiloxane defoamer composition available from Thompson-Hayward Chemical Co., Kansas City, Kans. under the trademark AF-100. The defoamer functions in the subject composition primarily as an aid in the vacuum encapsulation of tertiary coils.

The curing accelerator can be selected from among the conventional amine accelerating agents well known to those of ordinary skill in the art. Typically, such compounds are tertiary amines such as, for example, benzyldimethylamine, dimethylphenylamine and the like. It is preferred to include such an agent in the subject compositions to reduce the temperature at which a cure is effected, so as to minimize mechanical stresses in the cured epoxy after cooling.

The flexibilizer ingredient of the subject compositions is a liquid aliphatic polyepoxide resin. A preferred flexibilizer is a liquid poly(diglycidyl ester of linoleic dimer acid) available from Shell Chemical Company under the trademark Epon 871.

It is preferred that the subject compositions contain a finely particulate filler material such as quartz, mica, alumina or the like. A particularly preferred filler material is finely particulate hydrated alumina available as Solem 336-LV from Solem Industries, Inc. This material has a mean average particle size of about 15 micrometers. While the particles of filler do not penetrate the wound wire bundle of the tertiary to a great degree, they add strength to the bulk of the encapsulation, reduce the cost, lower the polymerization exotherm, act to dissipate heat build-up of the transformer and lower the expansion coefficient of the final resin.

The subject formulations, are prepared conventionally by separately combining the resin component and the hardener component, each with an appropriate amount of the filler, when present, to assure suitable viscosity. The curing accelerator and the defoamer, when present, are preferably incorporated into the hardener component and the flexibilizer, when present, is incorporated into the resin component.

Wire bundles, such as integrated high voltage transformer tertiaries, are encapsulated with the subject compositions by conventional methodology, e.g., placing the tertiary in a mold under high vacuum, adding the encapsulating composition, releasing the vacuum and heating for a sufficient time to cure the resin, generally, from 4 to 8 hours at temperatures between about 60° C. and 90° C. It is preferred in accordance with this invention to cure the subject compositions at about 70° C. for 4 hours followed by a 2 hour cure at 85° C.

The subject compositions have been demonstrated to be clearly superior to any commercial formulation tested as well as the experimental formulations previously prepared by us. This is so even though such other formulations usually contain an added wetting agent specifically to reduce surface energy and aid penetration.

The superiority of the subject compositions was established in two ways. First, the enhanced penetrating capacity of the subject compositions was demonstrated by crushing encapsulated tertiaries in a press and inspecting the wire bundle to determine whether it had remained intact. A wire bundle which remained intact was then carefully sectioned perpendicular to the winding, polished and inspected under a microscope for pits and voids among the wires. Tertiaries encapsulated with the subject compositions repeatedly showed a significantly reduced number of pits and substantially no voids under such examination and were clearly superior in comparison to tertiaries encapsulated with other formulations.

Second, the superior capacity of tertiaries encapsulated with the subject compositions to resist cracking caused by changes in temperature was shown by subjecting tertiaries encapsulated therewith to repeated thermal cycling. A thermal cycle is typically several hours at elevated temperature, e.g. about 100° C., followed by several hours at a reduced temperatures, e.g. about 30° C. Cracks which develop after a number of such cycles are manifest by corona discharge.

The following Example further illustrates this invention, it being understood that the invention is in no way intended to be limited to the details described therein. In the Example, all parts and percentages are on a weight basis and all temperatures are in degrees Celsius, unless otherwise stated.

EXAMPLE

An encapsulating composition was prepared from the following formulation:

| Ingredient (Trademark:Source) | Amount in Grams |
| --- | --- |
| Bisphenol A Diglycidyl ether resin (Epon 828: Shell Chemical Co.) | 40 |
| 3,4-Epoxycyclohexylmethyl-(3,4-epoxy)-cyclohexane carboxylate resin (CY-179: Ciba-Geigy) | 50 |
| Dodecyl succinic anhydride | 116 |
| Maleic anhydride adduct of methylcyclopentadiene (906: Ciba-Geigy) | 16 |
| Benzyldimethylamine | 4 |
| Diglycidyl ester of linoleic dimer acid resin (Epon 871: Shell Chemical Co.) | 10 |
| Hydrated Alumina (Solem 336-LV) | 389 |
| Silicone defoamer (AF-100: Thompson-Hayward Chemical Co.) | 2 |
| | 627 |

The Epon 828, CY-179, Epon 871 and AF-100 were combined and 109 grams of the alumina blended into the mixture. The dodecyl succinic anhydride, 906 and the benzyldimethylamine were combined and the remainder of the alumina blended into the mixture.

Commercial tertiaries of the type utilized in integrated high voltage transformers were placed in preheated molds which were then evacuated under vacuum to a pressure of about 250 mtorr. Appropriate amounts of the two mixtures to assure proper stoichiometry were heated to 75°, blended and added slowly under vacuum to fill each mold. When addition was complete, the vacuum was released. The molds were maintained at a temperature of about 70° for 4 hours after which the temperature was increased to about 85° for 2 hours.

Electrical testing of several hundred tertiaries encapsulated as above showed no operating failures or corona discharge up to 50 KV. After 6 thermal cycles of holding the coils at 105° for 2 hours, then at 35° for 2 hours per cycle, the coils showed a drop of only about 0.7 KV on the average. This is superior to epoxy formulations presently in production use.

Ten encapsulated tertiaries, chosen at random from two experimental batches, were carefully cut in half. One half of each tertiary was crushed in a press until it was substantially flattened. The wire bundle was removed and inspected. The wire bundle in each instance remained completely intact indicating excellent penetration of the bundle by the epoxy formulation.

The remaining half of each tertiary was lap polished and inspected under a microscope for pits and voids. A pit is less than a wire diameter and a void is two wire diameters or more. A visual count of pits and voids was made as a quantitative rating of penetration. The ten tertiaries encapsulated with the subject formulation, averaged 1 pit and 0 voids which is substantially better than any of 30 commercial epoxy formulations tested in a similar manner. Most of the commercial formulations, in fact, failed to pass the crush test for separation, which is a definite indication of incomplete penetration of the tertiary. This is a remarkable result when it is considered that in a similar test of a presently used commercial encapsulating formulation, the average of ten tertiaries was 5.5 pits and 0.8 voids.

We claim:

1. An encapsulating composition suitable for the encapsulation of wire coils comprising 1:1 stoichiometric amounts of:
   (a) an epoxy resin component comprising from about 40 to about 80 percent by weight of a liquid bisphenol A resin and from about 20 to about 60 percent by weight of a liquid cycloaliphatic epoxy resin; and
   (b) a hardener component comprising from about 70 to about 90 percent by weight of dodecyl succinic anhydride and from about 10 to about 30 percent by weight of the maleic anhydride adduct of methylcyclopentadiene.

2. An encapsulating composition in accordance with claim 1, wherein the epoxy component is comprised of a liquid diglycidyl ether of bisphenol A resin and a liquid 3,4-epoxycyclohexylmethyl(3,4-epoxy)cyclohexane carboxylate resin.

3. An encapsulating composition in accordance with claim 1, wherein said composition additionally contains up to about 70 percent by weight of one or more members of the group consisting of a defoamer, a curing accelerator, a flexibilizer and a suitable filler.

4. An encapsulating composition in accordance with claim 3, wherein said composition additionally contains from 0 to about 1 percent by weight of the defoamer from 0 to about 2.5 percent by weight of the curing accelerator, from 0 to about 3 percent by weight of the flexibilizer and from 0 to about 65 percent by weight of the filler.

5. An encapsulating composition in accordance with claim 4, wherein the epoxy component is comprised of from about 50 to about 60 percent by weight of the liquid bisphenol A resin and from about 40 to about 50 percent by weight of the liquid cyclophatic epoxy resin, the hardener component is comprised of from about 83 to about 88 percent by weight of dodecyl succinic anhydride and from about 12 to about 17 percent by weight of the maleic anhydride adduct of methylcyclopentadiene, and said composition contains from about 0.2 to about 0.4 percent by weight of the defoamer, from about 0.4 to about 0.8 percent by weight of the curing accelerator, from about 1 to about 2 percent by weight of the flexibilizer and from about 58 to about 62 percent by weight of the filler.

6. An encapsulating composition in accordance with any one of claims 3 or 5, wherein the defoamer is a polysiloxane defoamer composition, the curing accelerator is a tertiary amine, the flexibilizer is a liquid aliphatic polyepoxide resin and the filler is hydrated alumina.

7. An encapsulating composition in accordance with claim 6 wherein the accelerator is selected from the group consisting of benzyldimethylamine and dimethylphenylamine and the flexibilizer is a liquid poly(diglycidyl ester of a linoleic dimer acid).

8. An encapsulating composition in accordance with claim 6, wherein the hydrated alumina filler has a mean average particle size of about 15 micrometers.

* * * * *